United States Patent [19]
Kochi et al.

[11] Patent Number: 5,661,622
[45] Date of Patent: Aug. 26, 1997

[54] ROTARY MAGNETIC HEAD CYLINDER DEVICE FOR REDUCED VIBRATION AND PROPER HEAD/TYPE ALIGNMENT

[75] Inventors: Masanori Kochi, Kure; Akihiro Nakajima, Musashino; Yoshio Uemura, Katsuta; Toshihiko Imachi, Katsuta; Kuniaki Hirayama, Katsuta; Eijiro Tazawa, Nara; Kiyokazu Watanabe, Jyohoku-machi, all of Japan

[73] Assignee: Hitachi, Ltd., Tokyo, Japan

[21] Appl. No.: 681,605

[22] Filed: Jul. 29, 1996

Related U.S. Application Data

[63] Continuation of Ser. No. 494,886, Jun. 26, 1995, abandoned, which is a continuation of Ser. No. 201,638, Feb. 25, 1994, abandoned.

[30] Foreign Application Priority Data

Mar. 2, 1993 [JP] Japan ..................... 5-041419

[51] Int. Cl.⁶ .................................... G11B 15/60
[52] U.S. Cl. .......................... 360/130.24; 360/84
[58] Field of Search ........................ 360/130.24, 84, 360/107, 130.22, 130.23

[56] References Cited

U.S. PATENT DOCUMENTS

| 4,833,562 | 5/1989 | Kochi et al. ............ 360/130.24 |
| 5,526,207 | 6/1996 | Sawada et al. ............ 360/107 |

FOREIGN PATENT DOCUMENTS

| 56-94539 | 7/1981 | Japan ................. 360/130.24 |
| 1-30051 | 1/1989 | Japan ................. 360/130.24 |
| 1-109565 | 4/1989 | Japan ................. 360/130.24 |
| 3-120659 | 5/1991 | Japan ................. 360/130.24 |

Primary Examiner—Robert S. Tupper
Assistant Examiner—Kevin M. Watkins
Attorney, Agent, or Firm—Bardehle, Pagenberg, Dost, Altenburg, Frohwitter, Geissler & Partners

[57] ABSTRACT

A rotary magnetic recording and reproducing apparatus includes a stationary cylinder formed on a lower portion of an outer peripheral surface thereof with a guide lead for guiding a lower edge of a magnetic tape and defining a tape running face on an upper portion of the outer peripheral surface thereof, a first bulge portion formed on an upper edge portion of the tape running face of the stationary cylinder on a tape leaving side of the upper edge portion of the tape running face and a second bulge portion which is smaller in height than the first bulge portion and formed on the upper edge portion of the tape running face on the tape leaving side thereof and in the vicinity of the first bulge portion on a tape incoming side of the first bulge portion. The first bulge portion serves to relax shock or vibration of a magnetic tape leaving the magnetic head and the second bulge portion serves to improve "head-touch" of the magnetic tape.

5 Claims, 12 Drawing Sheets

ROTARY MAGNETIC HEAD CYLINDER DEVICE FOR REDUCED VIBRATION AND PROPER HEAD/TYPE ALIGNMENT

This application is a continuation of application Ser. No. 08/494,886 filed on Jun. 26, 1995, now abandoned, which is a continuation of application Ser. No. 08/201,638, filed on Feb. 25, 1994, now abandoned.

BACKGROUND OF THE INVENTION

1. Field of the Invention

The present invention relates to a rotary magnetic recording and reproducing apparatus which may be suitable to be used in a video tape recorder (VTR) or digital audio tape recorder (DAT). In particular, the present invention relates to a structure of a stationary cylinder of a cylinder drum of a rotary magnetic recording and reproducing apparatus, which is effective to relax shock or vibration of a magnetic tape when a magnetic head mounted on a rotary cylinder of the cylinder drum leaves from the magnetic tape and to improve the so-called "head-touch" of the magnetic tape in an area immediately before the magnetic head leaves from the magnetic tape to thereby improve a recording and reproducing performance of the rotary magnetic recording and reproducing apparatus.

2. Prior Art

In a rotary magnetic recording and reproducing apparatus of such type as mentioned, a recording or reproducing operation is performed by making a magnetic head mounted on a rotary cylinder rotating at high speed come in relative slide contact with a magnetic tape running along an outer peripheral surface of the rotary cylinder and along an outer periphery of a stationary cylinder disposed coaxially below the rotary cylinder, with a lower edge of the tape being guided along a helical lead formed on a lower portion of the outer peripheral surface of the stationary cylinder.

It is well known that, in such rotary magnetic recording and reproducing apparatus, the magnetic tape is mechanically vibrated when an upper edge of the magnetic tape which is descending along the outer peripheral surface of the rotary cylinder leaves from the magnetic head mounted on a lower edge portion of the rotary cylinder. Such mechanical vibration of the magnetic tape is due to a difference in pressure exterted in the radial direction between the magnetic tape on the stationary cylinder and a top end portion of the magnetic head which is slightly protruding from the outer peripheral surface of the rotary cylinder.

In order to relax this mechanical vibration of the upper edge portion of the magnetic tape, it is proposed in U.S. Pat. No. 4,833,562 issued to M. Kochi et al. and assigned to the same assignee as of this application that there be added of a small protrusion or bulge on an upper edge portion of an outer peripheral surface of the stationary cylinder to reduce the difference in pressure in the radial direction between the magnetic tape and the top end portion of the magnetic head before the magnetic head leaves from the upper edge portion of the magnetic tape to thereby restrict such mechanical vibration of the magnetic tape.

The conventional technique disclosed in the above mentioned reference in which mechanical vibration of the magnetic tape is restricted by providing the bulge will be described in detail with reference to FIGS. 12(a) to 16.

Figures 12A, 12C:
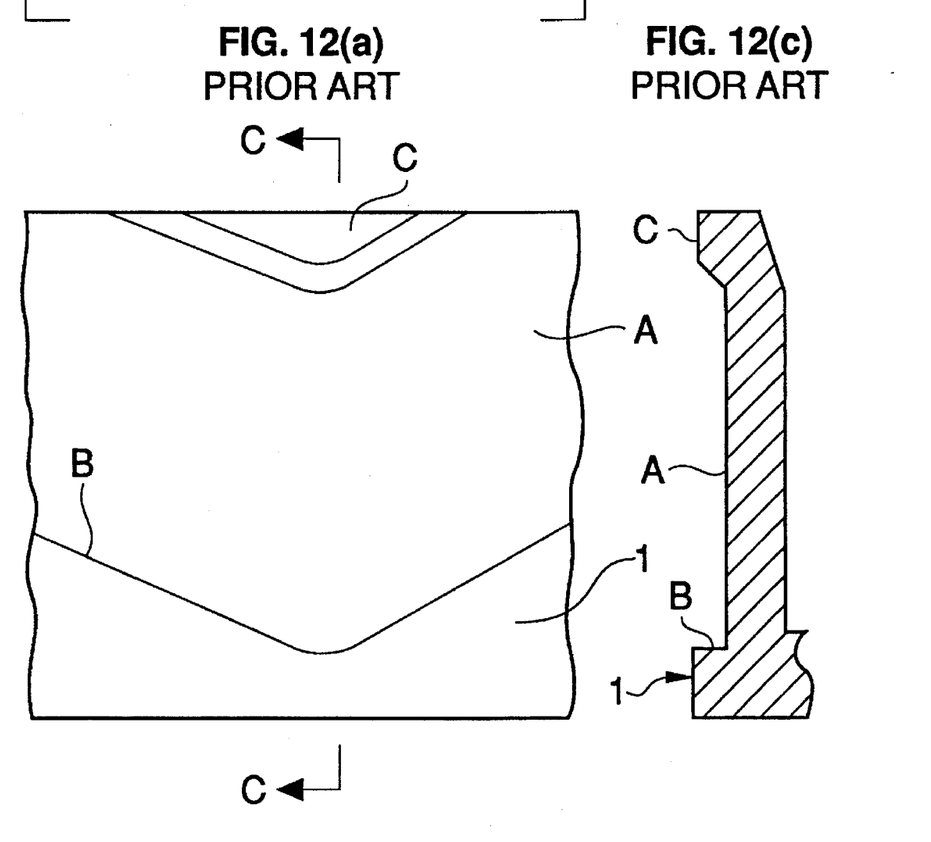
FIGS. 12(a) to 12(c) show a portion of a conventional rotary cylinder around a tape leaving position thereof.
Figure 12B:
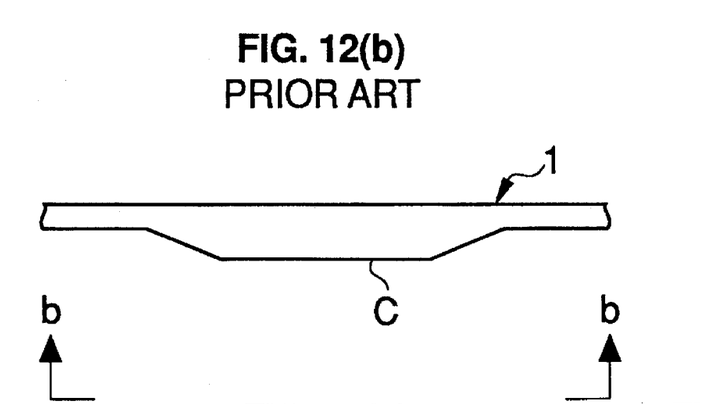
Figure 13A:
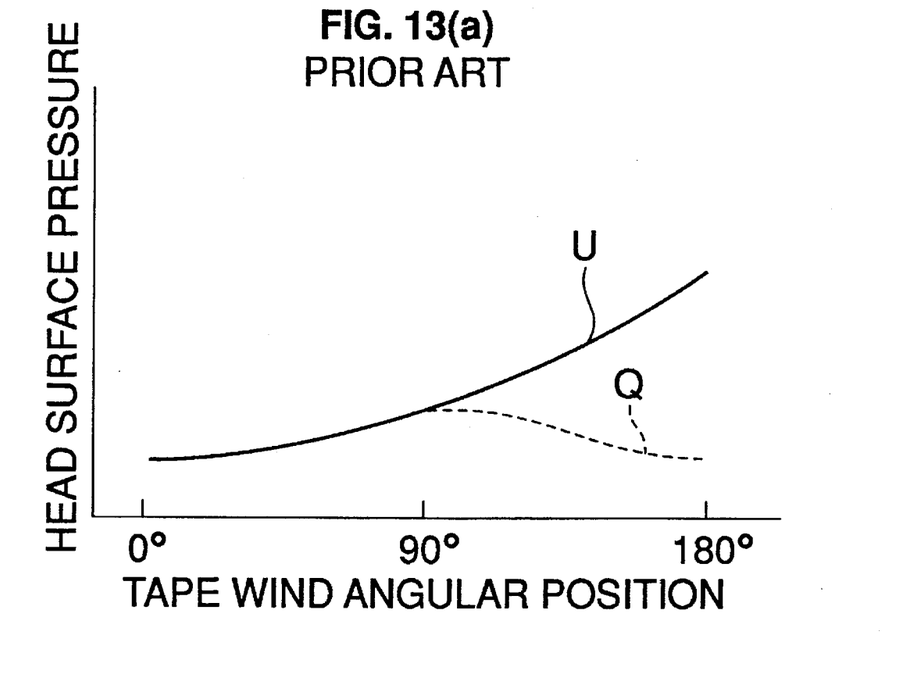
FIGS. 13(a) and 13(b) are graphs showing a relation between head surface pressure and angular position of a tape wound over the stationary cylinder and the rotary cylinder and a relation between tape vibration and tape wind angular position, respectively.
Figure 13B:
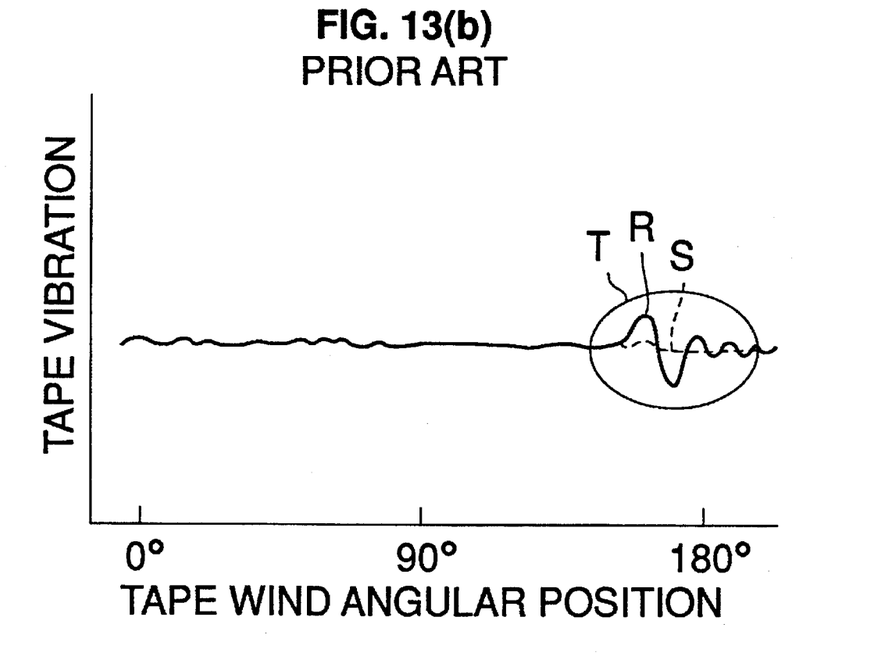

FIGS. 12(a), 12(b) and 12(c) are an enlarged plan view, an enlarged front view and an enlarged cross sectional view taken along a line c—c in FIG. 12(b), of a tape leaving portion of a conventional stationary cylinder of a rotary magnetic recording and reproducing apparatus shown in the above mentioned reference, respectively. The expression "tape leaving portion" means a portion of the stationary cylinder where a magnetic tape leaves from the stationary cylinder.

In FIGS. 12(a) to 12(c), the stationary cylinder 1 has a helical guide lead B formed in a lower portion of an outer peripheral surface thereof for guiding a lower edge of the magnetic tape and defining a lower edge of a tape running surface area A. In the tape leaving portion of an upper edge portion of the tape running surface area A, a bulge C is formed. The bulge C may be formed by machining the tape running surface area A and the tape lead B of the outer peripheral surface of the stationary cylinder except a corresponding portion thereof to the bulge C. The bulge C functions to push the magnetic tape outwardly in the radial direction in the tape leaving portion out to substantially the same radical height as that of the magnetic head to thereby at least reduce mechanical vibration of the magnetic tape when an upper edge portion of the magnetic tape leaves from the magnetic head on the rotary cylinder 2. That is, as shown by a dotted curve Q in FIG. 13(a) which corresponds to FIG. 10 of the above mentioned U.S. patent which shows the relationship of head surface pressure with respect to tape wind angular position and by a dotted curve S in FIG. 13(b) which corresponds to FIG. 11 of the same U.S. patent which shows the relationship of tape vibration with respect to tape wind angular position, the head surface pressure is reduced by the provision of the bulge formed at angular position of 180 corresponding to the tape leaving position and the tape vibration is at least reduced by the same bulge.

Figure 14A:
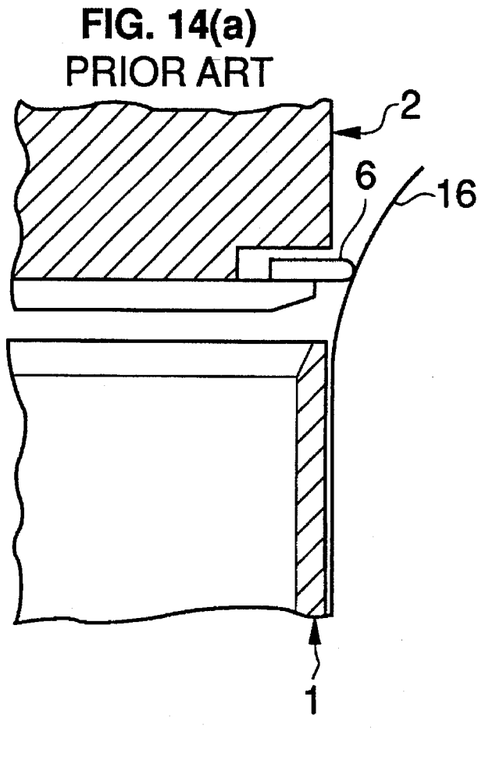
FIGS. 14(a) and 14(b) illustrate a contact of a metal evaporation tape with the magnetic head in the conventional technique.
Figure 14B:
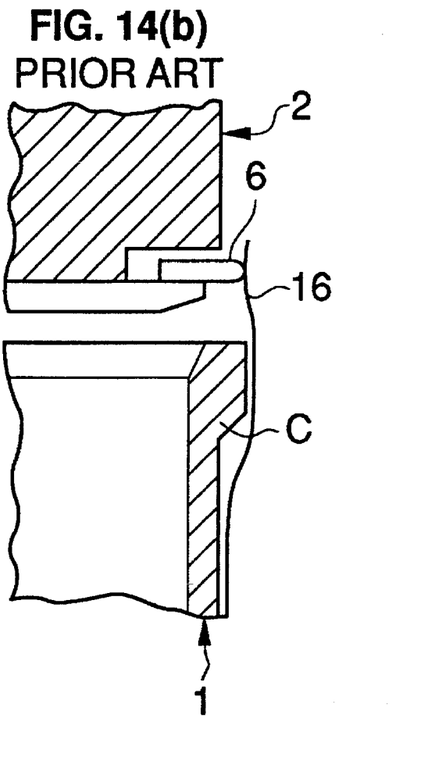

That is, as shown in FIG. 14(a) which is a cross section of an assembly of a stationary cylinder 1 and a rotary cylinder 2 having a magnetic head 6 of a conventional rotary magnetic recording and reproducing apparatus having such structure as shown in FIGS. 12(a) to 12(c), illustrating a contact between a magnetic tape 16 and the magnetic head 6 mounted on the rotary cylinder 2 when the magnetic head 6 is in an upstream side of the tape leaving portion of the stationary cylinder 1 and in slide contact with the magnetic tape, the upper portion of the magnetic tape is bent radially outward by the magnetic head 6. Therefore, if the magnetic tape descends as it is, the upper edge thereof shall be dropped radially inward when the contact between it and the magnetic head is broken. However, as shown in FIG. 14(b) which illustrates a contact between the magnetic tape 16 and the magnetic head 6 in an area in which the magnetic head 6 is about to leave from the magnetic tape 16, the bulge C formed in the head leaving portion of a tape running surface area A of the stationary cylinder 1 raises the upper portion of the magnetic tape 16 up to substantially the same radially outward level as the magnetic head 6 before it leaves from the magnetic tape 16. Therefore, the head surface pressure exerted by the magnetic tape 16 acting on the magnetic head 6 is reduced enough to relax mechanical shock or vibration of the magnetic tape 16 when the latter leaves from the magnetic head 6. Such bulge C is effective when the magnetic tape 16 is relatively flexible.

Figure 5A:
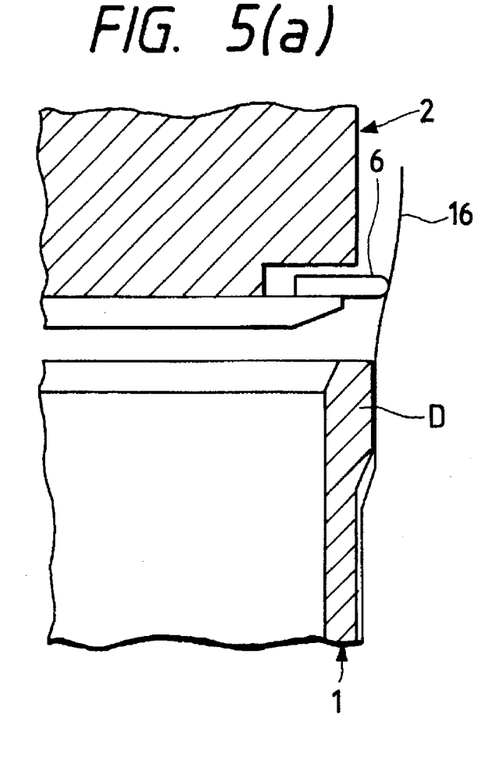
FIGS. 5(a) and 5(b) illustrate a contact of a metal evaporation tape with the magnetic head in the first embodiment.

In such conventional technique, however, when the magnetic tape is a metal evaporation (ME) tape which is prepared by evaporating magnetic material on a relatively thick plastic base plate, an upper edge portion of the stiff ME tape 16 is pushed out by the magnetic head 6 from the surface of the rotary cylinder 2 as shown in FIG. 5(a) to be described later, slightly before the tape reaches the tape leaving position as shown in FIG. 14(a), resulting in degradation of the so called "head-touch".

Figure 15:
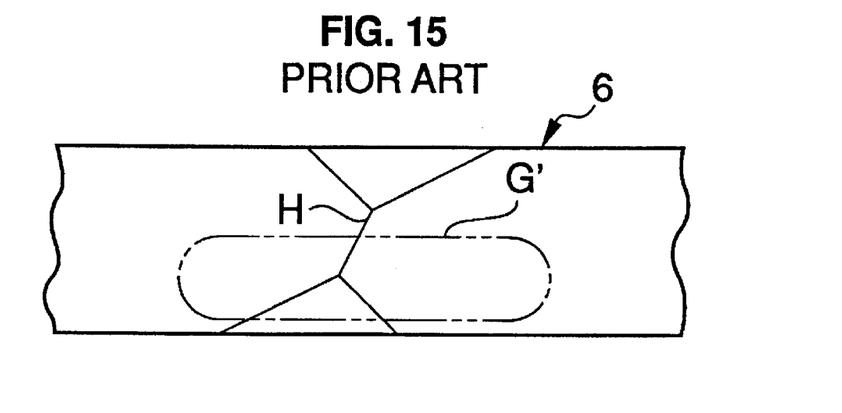
FIG. 15 illustrates a contact face of the magnetic tape with respect to the magnetic head at a position immediately before it is separated from the tape in the conventional technique.

FIG. 15 shows a portion of the magnetic head 6, including a magnetic or working gap H in which signal is transferred between the head and the magnetic tape, wherein area G', indicated by a chain line, is a slide contact area in which the magnetic tape 16 is in slide contact with the magnetic head 6 when the relative position of the magnetic tape 16 to the magnetic head 6 is as shown in FIG. 14(a). That is, when the tape 16 is stiff, it does not contact with a whole portion of the working gap H of the magnetic head 6 before the latter reaches a position corresponding to the tape leaving portion on the stationary cylinder. Therefore, it is impossible to obtain acceptable recording and reproducing characteristics of the rotary magnetic recording and reproducing apparatus.

Figure 16:
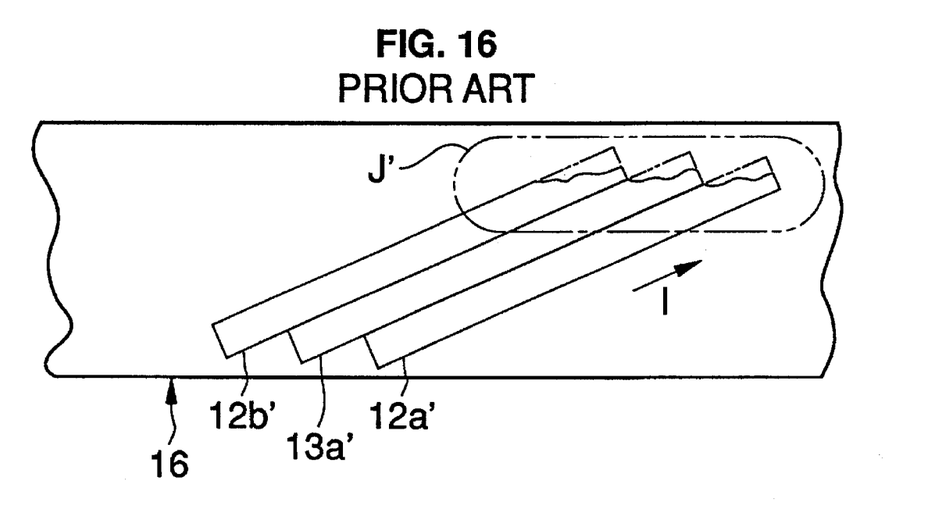
FIG. 16 shows a magnetized pattern on the magnetic tape and the contact region of the tape with the head.

FIG. 16 illustrates a recording pattern including magnetically recorded tracks 12a', 13a', 12b' . . . on a magnetic tape running along a conventional tape running surface of the stationary cylinder mentioned above, when viewed from a diamagnetic surface thereof. In FIG. 16, J' depicts a region including the tape leaving portion of the magnetic head 6. Thus, the positional relationship of the magnetic head and magnetic tape as illustrated in FIGS. 14(a) and 15, results in insufficient magnification of the upper portions of tracks 12a', 1ea', and 12b' as illustrated in FIG. 16.

Figure 17:
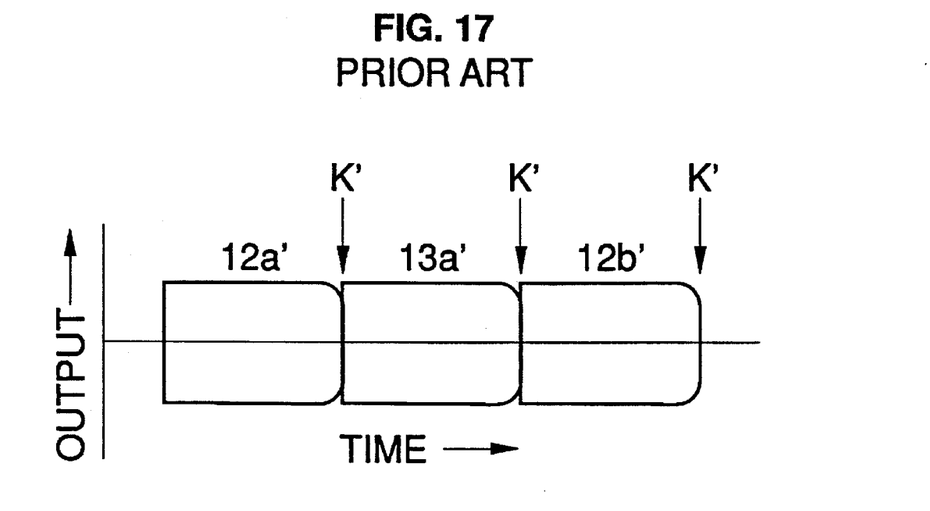
FIG. 17 shows a reproduced waveform obtained from the magnetized pattern shown in FIG. 16.

FIG. 17 shows a signal waveform obtained when the tape 16 having such magnetized pattern as shown in FIG. 16 is reproduced. In FIG. 17, the ordinate shows the output level and the abscissa shows time. K' in FIG. 17 depicts an area in which the magnetic head 6 is separated from the tape 16. FIG. 17, indicates that the output level of signal reproduced from the upper portions of the tracks 12a', 13a', 12b', . . . , is lowered. Such state is displayed on a lower portion of a television screen with low S/N ratio.

As mentioned with reference to FIGS. 12(a) to 17, although the conventional recording and reproducing apparatus in which the bulge C is provided on a tape leaving portion of the tape running surface portion of the outer peripheral surface of the stationary cylinder is very effective to restrict vibration of the magnetic tape in the tape leaving position, there is no consideration as to degradation of the "head-touch" problem which occurs, for example, when the tape used is stiff.

Japanese Patent Application Laid-open No. Hei 4-298846 discloses another conventional technique for reducing vibration of tape when it leaves a video head. In this technique, a recess and a bulge are formed on a stationary cylinder surface in upstream and down stream portions of a tape leaving point, respectively. In this technique, the bulge is formed in order to reduce vibration of the tape caused by the recess which is provided to improve a contact with the tape and a magnetic head. The head-touch problem is also not solved by this technique.

SUMMARY OF THE INVENTION

An object of the present invention is, therefore, to solve the "head-touch" problem of the conventional technique without jeopardizing the advantage of restriction of vibration of a magnetic tape. In other words, an object of the present invention is to provide a rotary magnetic recording and reproducing apparatus which is capable of relaxing shock or vibration which occurs when a magnetic head is separated from a magnetic tape and of maintaining an acceptable "head-touch" in a position of the magnetic head immediately before it leaves from the magnetic tape even if the tape is stiff, so that recording and reproducing characteristics thereof remain stable and acceptable over a whole track region.

In order to achieve the above object, a rotary magnetic recording and reproducing apparatus according to the present invention includes a stationary cylinder having a first bulge portion which is formed on a tape leaving portion in an upper edge portion of a tape running surface thereof and a second bulge portion which may be smaller in height than the first bulge portion and is formed on the upper edge portion of the tape running surface at least in the vicinity of the first bulge portion on a downstream side of the first bulge portion with respect to the first bulge portion.

The first and/or second bulge portion may be formed during cutting operation of the tape running surface portion of the stationary cylinder to form a lead.

By providing the first bulge portion on the tape outlet portion of the upper edge portion of the tape running surface and the lower second bulge portion on the upper edge portion of the tape running surface at least in the vicinity of the first bulge portion in the upstream side of the first bulge portion, the magnetic tape, even if it is stiff, is deformed at a position immediately before a magnetic head is separated from the tape by the second bulge portion in such a way that the tape follows an outer peripheral surface of the stationary cylinder to thereby cause the tape at this position to be in good contact with the whole gap region of the magnetic head. Therefore, it is possible to obtain a good "head-touch" and hence stable recording and reproducing characteristics. Further, since it is possible to reduce the head surface pressure at the tape leaving position, at which the magnetic head is separated from the tape, with respect to the magnetic head by the first bulge portion as in the conventional technique, the effect of relaxing shock or vibration when the head is separated from the tape can be maintained.

DETAILED DESCRIPTION OF THE PREFERRED EMBODIMENTS

A first embodiment of the present invention will be described with reference to FIGS. 1 to 8.

Figure 1:
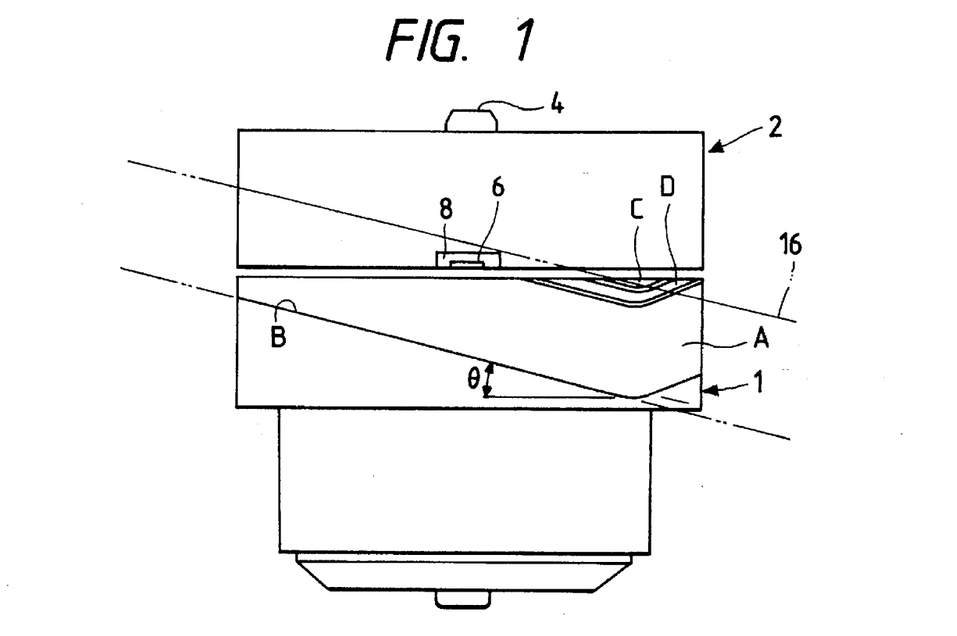
FIG. 1 is a front view of a rotary magnetic recording and reproducing apparatus according to a first embodiment of the present invention.
Figure 2:
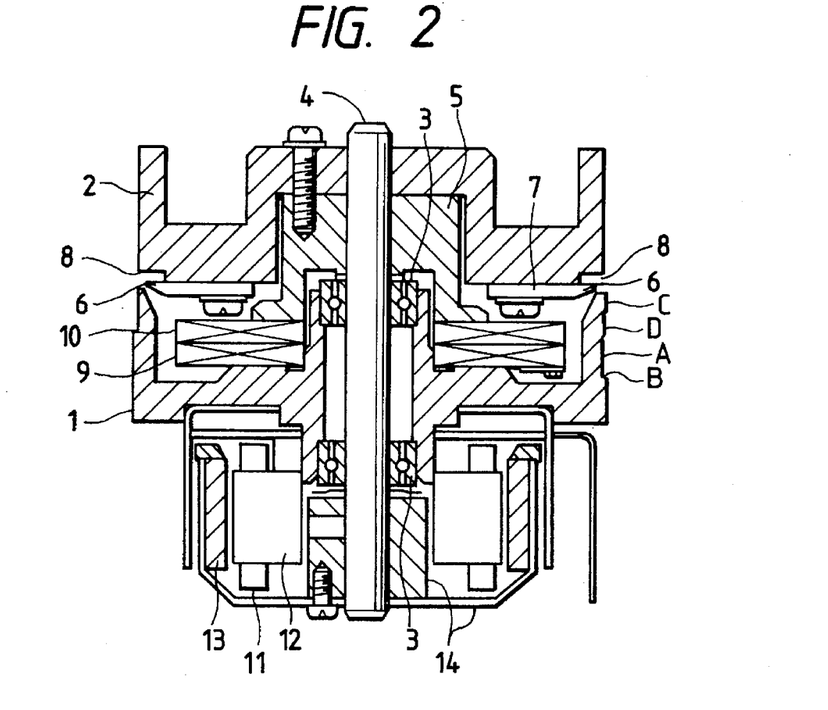
FIG. 2 is a cross section of the first embodiment shown in FIG. 1.

First, a rotary magnetic recording and reproducing apparatus in which the present invention is incorporated will be described briefly with reference to FIG. 1 which is a front view of the rotary magnetic recording and reproducing apparatus and FIG. 2 which is a cross section of the apparatus shown in FIG. 1. In FIGS. 1 and 2, a stationary cylinder 1 supports a shaft 4 rotatably through ball bearings 3 and a disc 5 is fitted to an upper portion of the shaft 4. The rotary cylinder 2 is fixedly secured onto the disc 5 by a means of fixation such as screws. A head support plate 7 on which magnetic heads 6 are mounted is fixedly secured to the rotary cylinder 2 by means of fixation such as screws. These magnetic heads 6 protrude through head windows 8 provided in a lower edge portion of an outer peripheral surface of the rotary cylinder 2 outwardly by a predetermined small distance measured from the outer peripheral surface.

A stator portion 9 and a rotor portion 10 of a rotary transformer, which are fixed to a lower surface of the disc 5 and to an upper surface of the stationary cylinder 1 by adhesive, respectively, are faced each other with a minute gap therebetween. The rotary transformer constituted with the stator portion 9 and the rotor portion 10 has any conventional structure and functions to exchange signals between the magnetic heads 6 and a recording and reproducing system circuit in a known manner. Stator coils 11 are fixed to a lower portion of the stationary cylinder 1 through a suitable support member 12 and a rotary magnet 13 is fixed to a lower portion of the shaft 4 through a suitable support member 14. The stator coils 11 and the rotary magnet 13 are faced each other with a predetermined gap therebetween and constitute a motor portion for driving the rotary cylinder 2.

By selectively supplying electric current to the stator coils 11, the rotary magnet 13 and the rotary cylinder 2 integral therewith, etc., are rotated and a recording or reproducing operation for video signal, etc., is performed through a relative slide contact between the magnetic heads 6 mounted on the rotary cylinder 2 and a known magnetic tape wound on the cylinders over a predetermined angle and running therealong by means of a known tape drive mechanism.

As shown in FIG. 1, a helical lead B is formed on an outer peripheral surface of the stationary cylinder 1 for stably guiding a lower edge of the tape therealong to stably run a tape 16. The rotary magnetic recording and reproducing apparatus according to the first embodiment may be used in a video tape recorder (VTR) of such as VHS standard. In such case, a slant angle θ of the helical lead B is determined according to the VHS standard. When the apparatus is used in a 8 mm video or DAT, etc., the slant angle of the lead B is, of course, selected according to the standard of 8 mm video or DAT. An area A of the outer peripheral surface of the stationary cylinder 1 above the lead B is a tape running surface on which the tape is wound over a predetermined peripheral angle and runs in slide contact therewith.

Figure 3A:
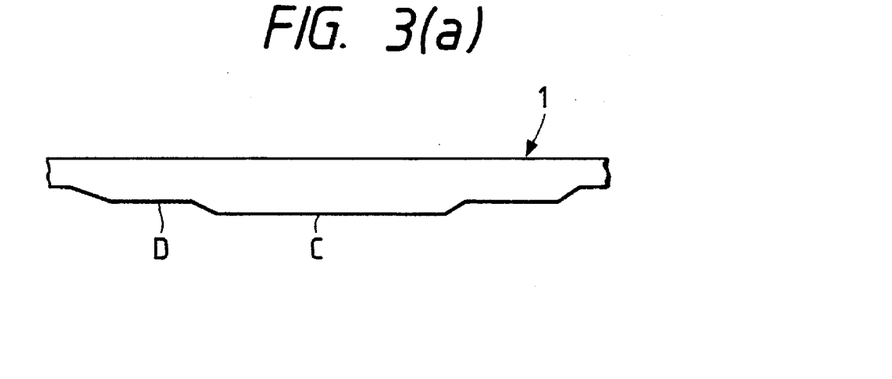
FIG. 3(a) is an extended plan view of a portion of a stationary cylinder around a tape leaving portion thereof according to the first embodiment of the present invention.
Figure 3B:
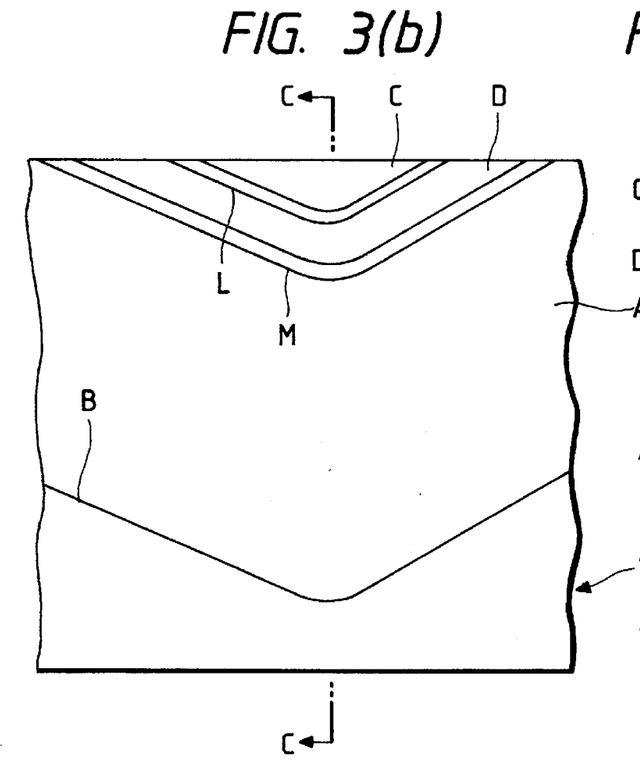
FIG. 3(b) is a front view of the portion shown in FIG. 3(a)
Figure 3C:
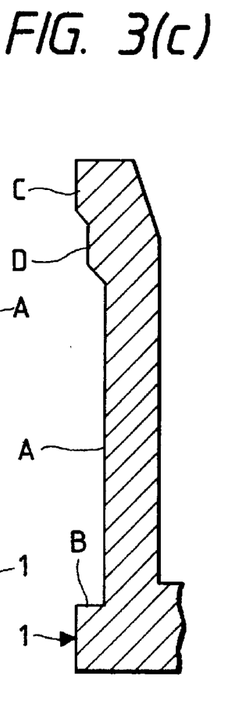
FIG. 3(c) is a cross section taken along a line c—c in FIG. 3(b)

FIGS. 3(a) to 3(c) illustrate a portion of the stationary cylinder 1 around a type leaving portion. FIG. 3(a) is an extended plan view of the tape leaving portion of the stationary cylinder 1 in enlarged scale, FIG. 3(b) is an enlarged front view of the tape leaving portion and FIG. 3(c) is a cross section taken along a line c—c in FIG. 3(b).

As shown in FIGS. 1 and 3(a) to 3(c), a first protrusion or bulge portion C is formed in the tape leaving portion in an upper edge portion of the tape running surface A of the stationary cylinder 1 as in the conventional structure. According to the present invention, a second protrusion or bulge portion D is further formed in proximity to the first bulge portion C. The second bulge portion D may be smaller in height measured from the tape running surface A than the first bulge portion C. In this embodiment, the second bulge portion D extends from an upstream side of the first bulge portion C through a lower edge thereof to a downstream side thereof, with a contour line M of the second bulge portion D on the side of the lead B is substantially in parallel to a contour line L of the first bulge portion C. In other words, the second bulge portion D is substantially analogous to the first bulge portion C. These bulge portions may be formed easily during formation of the lead B and the tape running surface A by means of, for example, a numerically controlled, hydraulic profiling cam type lead machining lathe, as disclosed in the aforementioned U.S. Pat. No. 4,833,562. That is, these bulge portions can be easily formed by keeping a portion of the outer peripheral surface of the stationary cylinder corresponding to these bulge portions less machined in forming the lead B and the tape running surface A by cutting the outer peripheral surface of the stationary cylinder 1.

When the first bulge portion C and the second bulge portion D are to be formed by using such numerically controlled lathe, it is usual that the contour line L of the first bulge portion C and the contour line M of the second bulge portion D become parallel to the lead B since a cam to be used is the same. However, the first and second bulge portions C and D can be formed by using any other technique although such lathe is preferable.

Further, it is enough that the second bulge portion D according to the present invention is formed in the vicinity of the first bulge portion C in an upstream side thereof with respect to the tape and that the second bulge portion D is smaller in height than the first bulge portion C by a predetermined amount.

Figure 4:
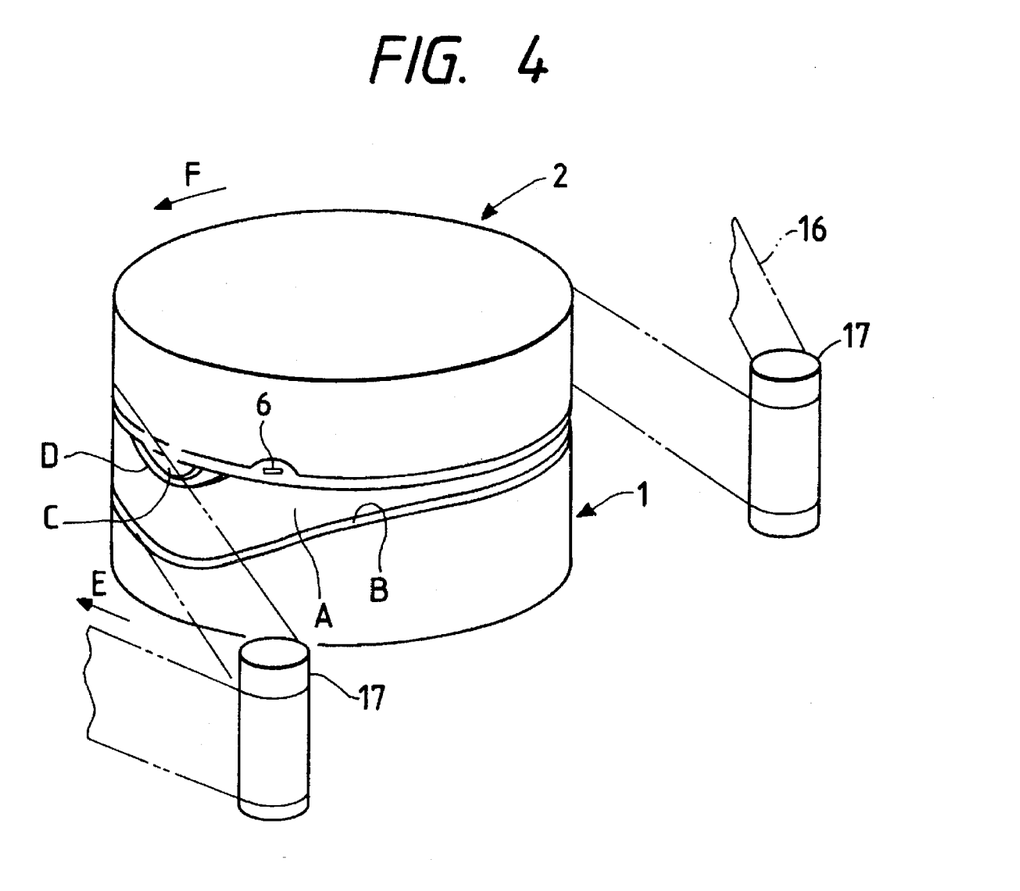
FIG. 4 is a perspective view of the rotary magnetic recording and reproducing apparatus of the first embodiment with the tape being wound on the rotary head assembly.

FIG. 4 is a perspective view of the rotary magnetic recording and reproducing apparatus of the first embodiment with a tape 16 being wound on the rotary head assembly. In FIG. 4, the tape 16 runs along the lead B in a direction shown by an arrow E and the rotary cylinder 2 rotates at high speed in a direction shown by an arrow F, during the recording or reproducing operation. Incidentally, reference numerals 17 depict guide pins for guiding the tape 16 along the lead B. In FIG. 4, the magnetic head 6 is just separated from the tape 16 after contacting with an upper end portion of the tape 16.

Figure 5B:
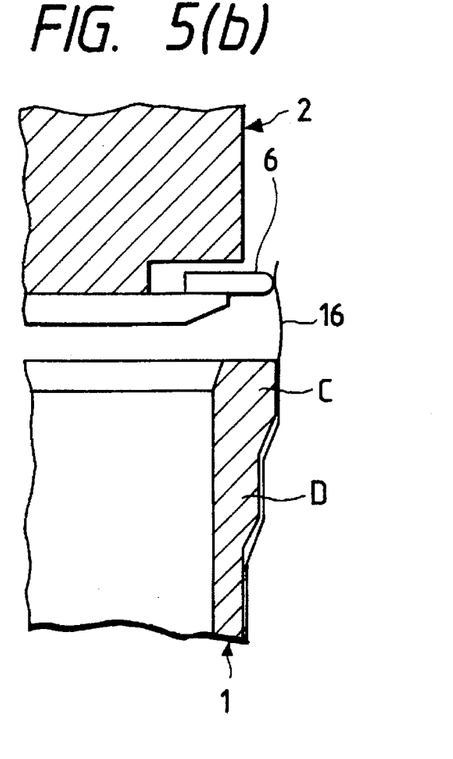

FIGS. 5(a) and 5(b) illustrate the state of contact between the magnetic head 6 and the magnetic tape 16 which may be a metal evaporation tape which is thin and whose stiffness is high. In FIG. 5(a), the magnetic head 6 is in a position immediately before the tape leaving position and, in FIG. 5(b), the head 6 is just in the tape leaving position.

As shown in FIG. 5(a), immediately before the magnetic head 6 enters into the tape leaving position, the magnetic tape 16 is deformed by the second bulge portion D which is smaller in height than the first bulge portion C in such a way that it follows the outer peripheral surface of the rotary cylinder 2 and can uniformly contact with a whole gap region of the magnetic head 6 in the shown rotational phase position.

In the state where the magnetic head 6 is in the tape leaving position as shown in FIG. 5(b), the head surface pressure of the magnetic head 6 due to the magnetic tape 16 can be reduced by the effect of the first bulge portion C. Therefore, the advantage of relaxing shock or vibration of the tape at the time when it leaves from the magnetic head is maintained by the second bulge D as in the conventional technique and the head touch in the tape leaving position is improved by the first bulge C.

Figure 6:
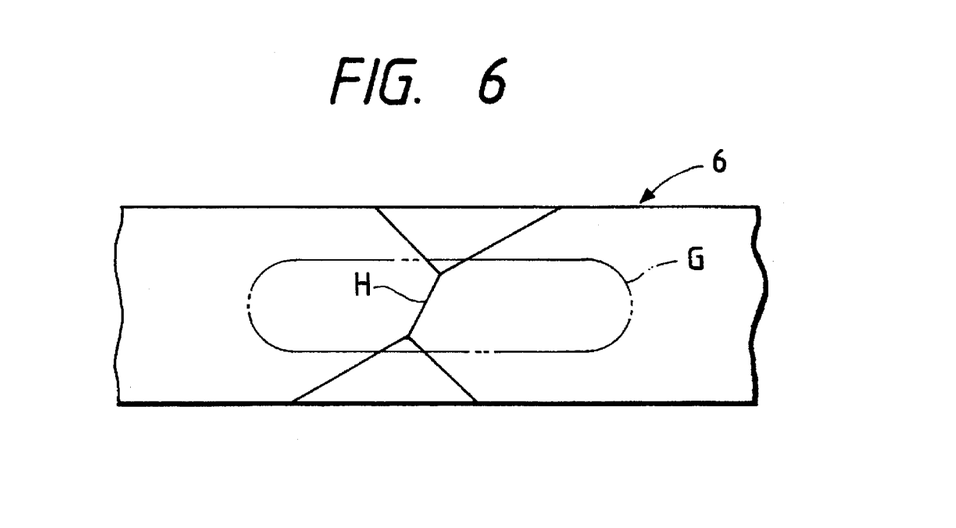
FIG. 6 illustrates a contact face of the magnetic tape with respect to the magnetic head at a position immediately before it is separated from the tape in the first embodiment.

FIG. 6 illustrates a tape contact face (tape slide face) of the magnetic head 6 in the rotational phase position shown in FIG. 5(b). In FIG. 6, H indicates the gap through which signal is exchanged and G indicates the contact region of the tape 16. As shown in FIG. 6, the tape 16 uniformly contacts with the magnetic head 6 in its region G covering the whole working gap H of the magnetic head 6 and thus the "head-touch" is improved, resulting in desired recording or reproducing operation.

Figure 7:
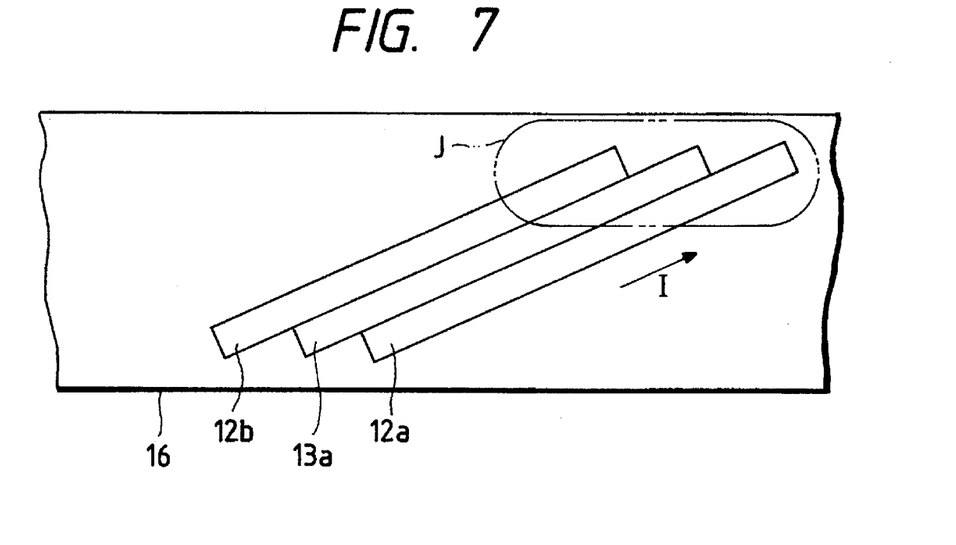
FIG. 7 shows a magnetized pattern on the magnetic tape and the contact region of the tape with the head.

FIG. 7 illustrates a magnetizing pattern, including tracks 12a, 13a, 12b... on the magnetic tape 16, when looked from a diametric surface thereof. In FIG. 7, I indicates a scan direction of the magnetic head 6 and J depicts a region including tape leaving portion of the magnetic head 6. As shown in FIGS. 5(a) and 6, since the tape 16 does sufficiently contact with the whole region of the working gap portion H of the magnetic head 6, the tracks 12a, 13a, 12b ... can be magnetized enough over the whole region.

Figure 8:
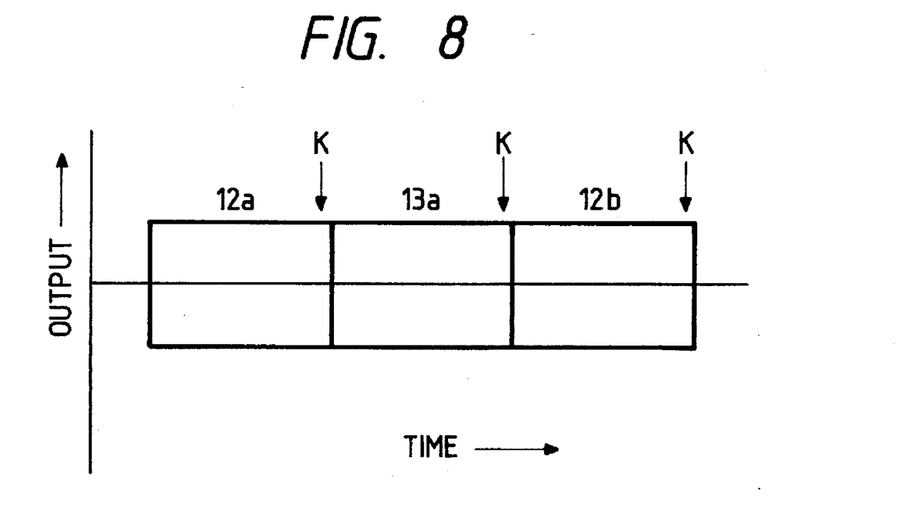
FIG. 8 shows a reproduced waveform obtained from the magnetized pattern shown in FIG. 7.

FIG. 8 shows a reproduced waveform obtained when the tape 16 having such magnetized pattern as shown in FIG. 7 is reproduced. In FIG. 8, an ordinate shows an output level and an abscissa shows time. K in FIG. 8 depicts an area in which the magnetic head 6 is separated from the tape 16. As will be clear from FIG. 8, the output level of signal reproduced from the tracks 12a, 13a, 12b, ..., is maintained preferably and thus it is possible to obtain a high quality image with good S/N ratio over a whole television screen.

Figure 9A:
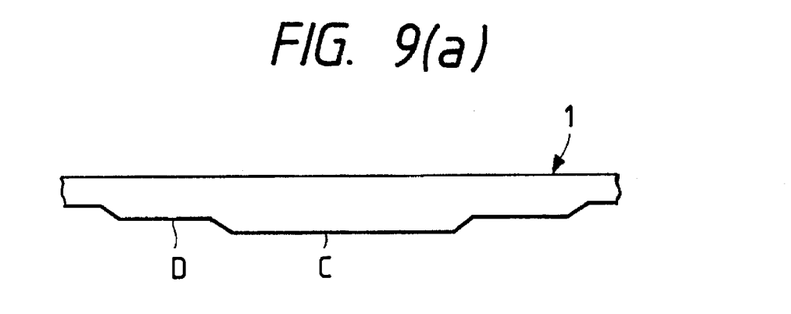
FIG. 9(a) is an extended plan view of a portion of a stationary cylinder around a tape leaving portion thereof according to a second embodiment of the present invention.
Figure 9B:
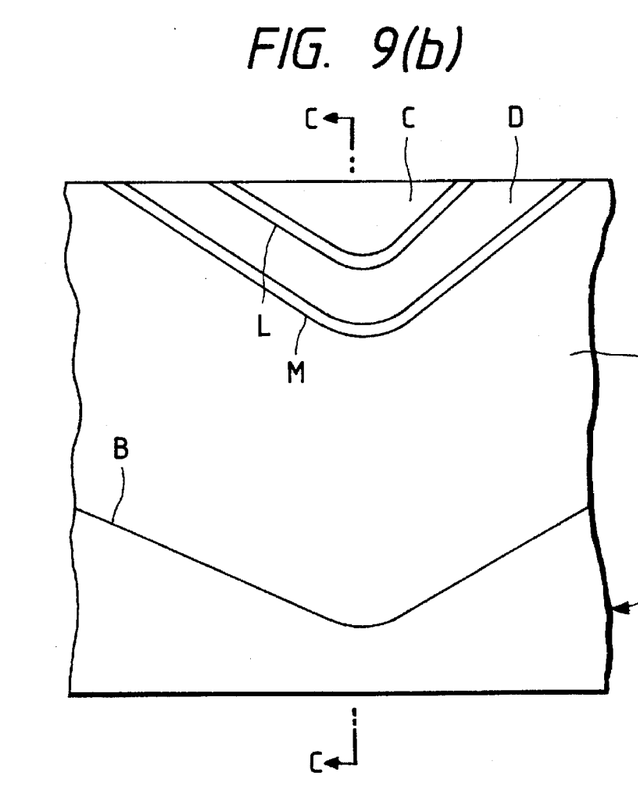
FIG. 9(b) is a front view of the portion shown in FIG. 9(a)
Figure 9C:
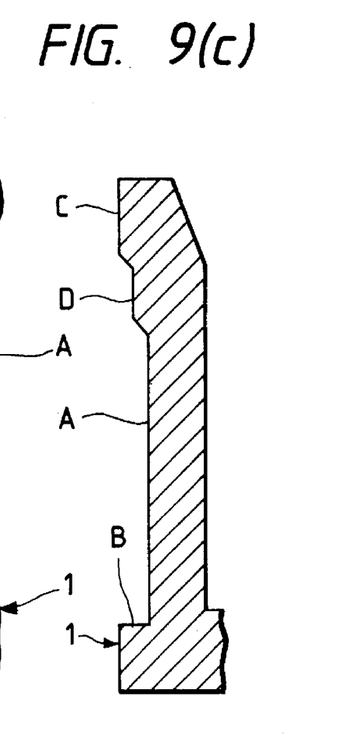
FIG. 9(c) is a cross section taken along a line c—c in FIG. 9(b)

FIGS. 9(a) to 9(c) illustrate a portion of the stationary cylinder 1 around a tape leaving portion, according to a second embodiment of the present invention. FIG. 9(a) is a extended plan view of the tape leaving portion of the stationary cylinder 1 in enlarged scale, FIG. 9(b) is an enlarged front view of the tape leaving portion and FIG. 9(c) is a cross section taken along a line c—c in FIG. 9(b). In this embodiment, a contour line L of a first bulge portion C and a contour line M of a second bulge portion D are in parallel to each other while the contour line L and the contour line M are not in parallel to a lead B. With this structure, substantially the same effect as that obtained by the first embodiment can be obtained.

Figure 10A:
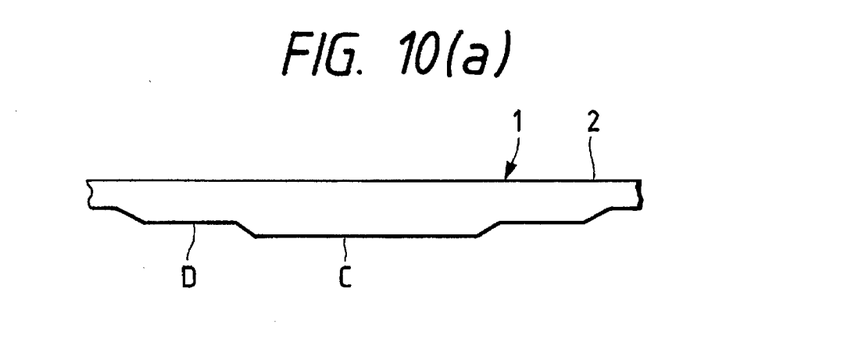
FIG. 10(a) is an extended plan view of a portion of a stationary cylinder around a tape leaving portion thereof according to a third embodiment of the present invention.
Figures 10B, 10C:
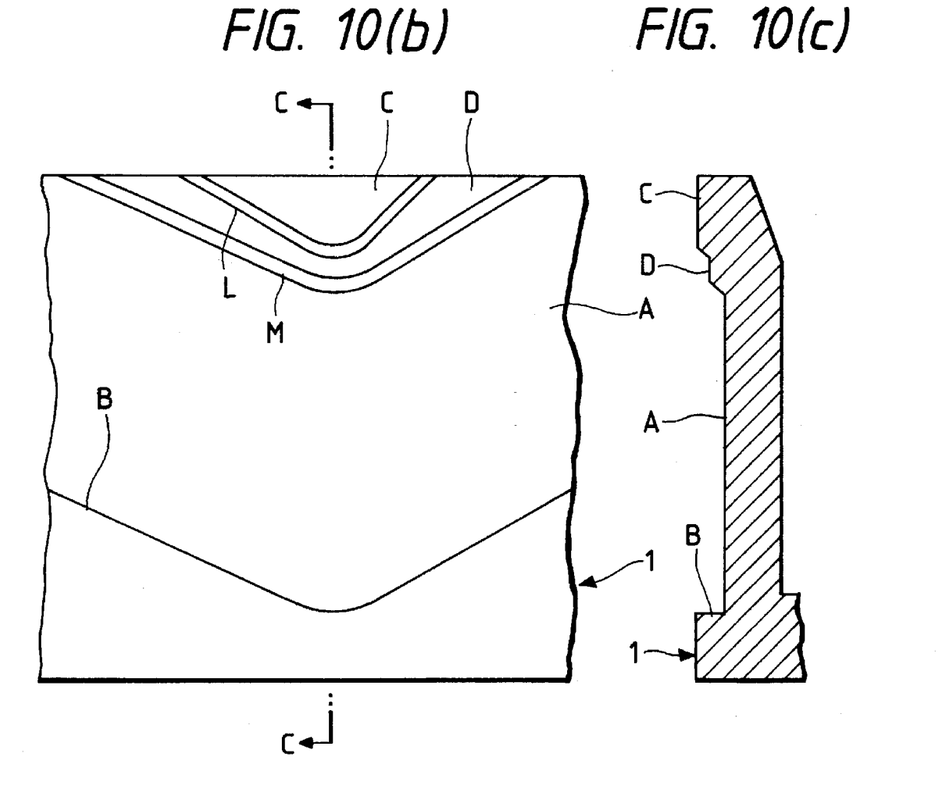
FIG. 10(b) is a front view of the portion shown in FIG. 10(a)
FIG. 10(c) is a cross section taken along a line c—c in FIG. 10(b)

FIGS. 10(a) to 10(c) illustrate a portion of the stationary cylinder 1 around a tape leaving portion, according to a third embodiment of the present invention. FIG. 10(a) is a extended plan view of the tape leaving portion of the stationary cylinder 1 in enlarged scale, FIG. 10(b) is an enlarged front view of the tape leaving portion and FIG. 10(c) is a cross section taken along a line c—c in FIG. 10(b). In this embodiment, a contour line L of a first bulge portion C is not parallel to a lead B while a contour line M of a second bulge portion D is in parallel to the lead B. With this structure, substantially the same effect as that obtained by the first embodiment can be obtained.

Figure 11A:
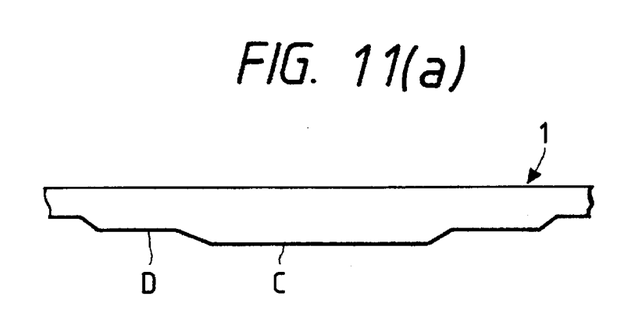
FIG. 11(a) is an extended plan view of a portion of a stationary cylinder around a tape leaving portion thereof according to a fourth embodiment of the present invention.
Figures 11B, 11C:
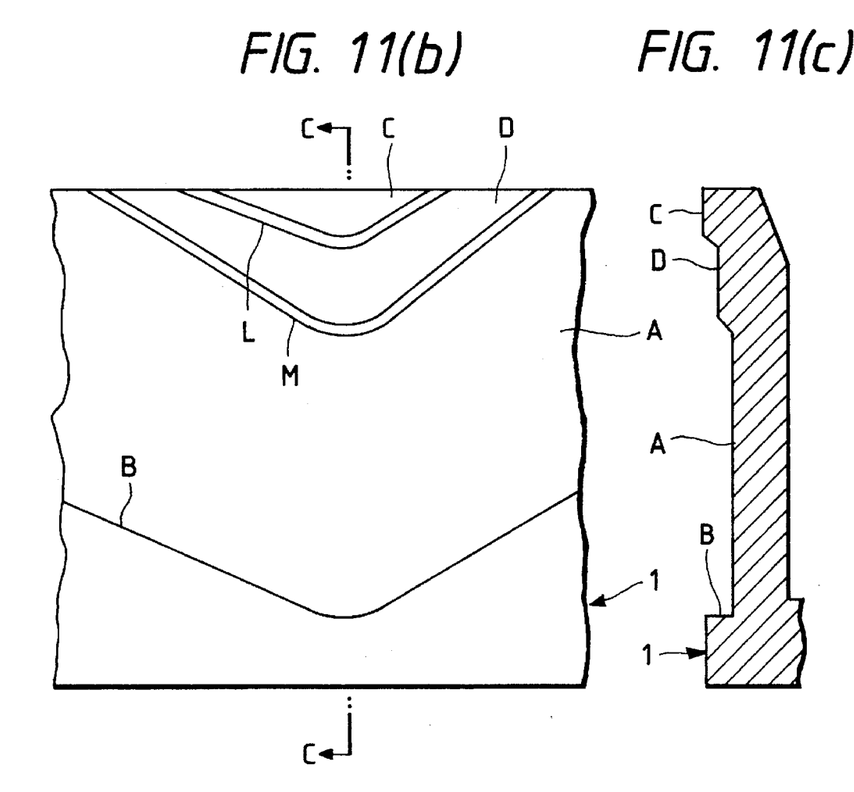
FIG. 11(b) is a front view of the portion shown in FIG. 11(a)
FIG. 11(c) is a cross section taken along a line c—c in FIG. 11(b)

FIGS. 11(a) to 11(c) illustrate a portion of the stationary cylinder 1 around a tape leaving portion, according to a fourth embodiment of the present invention. FIG. 11(a) is a extended plan view of the tape leaving portion of the stationary cylinder 1 in enlarged scale, FIG. 11(b) is an enlarged front view of the tape leaving portion and FIG. 11(c) is a cross section taken along a c—c in FIG. 11(b). In this embodiment, a contour line L of a first bulge portion C is parallel to a lead B while a contour line M of a second bulge portion D is not parallel to the lead B. With this structure, substantially the same effect as that obtained by the first embodiment can be obtained.

In a fifth embodiment which is not shown, a contour line L of a first bulge portion C, a contour line M of a second bulge portion D and a lead B are not in parallel to each other. With even such structure, substantially the same effect as that obtained by the first embodiment can be obtained.

The outer peripheral surface of the stationary cylinder 1 in each of the first to fifth embodiments can be machined easily by using a device such as any NC, camless lead cutting machine.

Although the effect of improving the "head contact" immediately before the magnetic head is separated from the magnetic tape can be commonly obtained in the described embodiments, the program capacity is minimum when the lead B, the contour line L of the first bulge portion C and the contour line M of the second bulge portion D are parallel to each other and maximum when all of them are not parallel to each other. Therefore, the first embodiment in which the lead B and the contour lines L and M are parallel provides the minimum program capacity and the fifth embodiment provides the maximum program capacity. The second to fourth embodiments are in between the first and fifth embodiments, respectively.

Although the bulges shown and described have symmetrical shapes with respect to an axis of the stationary cylinder, it will be appreciated that downstream halves thereof are unnecessary in view of the aimed effects and may be removed. However, in such case, machining steps are required to remove them, resulting in an increased manufacturing cost.

As described hereinbefore, in the rotary magnetic recording and reproducing apparatus according to the present invention in which a first bulge portion is formed in the tape leaving portion in an upper edge portion of the tape running surface of the stationary cylinder and a second bulge portion which is smaller in height measured from the tape running surface than the first bulge portion is formed in proximity to the first bulge portion, on an upstream side thereof with respect to the magnetic tape, the magnetic tape in a position immediately before the tape leaving portion of the magnetic head is deformed by the second bulge portion such that the tape follows the outer peripheral surface of the stationary cylinder so that the tape can uniformly contact with the whole gap area of the magnetic head. Therefore, the "head-touch" is improved, resulting in stable recording or reproducing characteristics. This effect can be obtained in addition to the effect of relaxing shock or vibration of the tape caused by reduction of facial pressure exerted by the magnetic tape onto the magnetic head at a position at which the magnetic head is separated from the magnetic tape due to the provision of the first bulge portion.

That is, since shock or vibration is relaxed by the first bulge portion and "head-touch" at the position immediately before the position at which the magnetic head is separated from the magnetic tape is improved by the second bulge portion, it is possible to provide a rotary magnetic recording and reproducing apparatus capable of making a higher quality recording or reproducing possible.

What is claimed is:

1. A rotary magnetic recording and reproducing apparatus for reducing vibration and maintaining proper head-touch, said apparatus comprising:

a rotary cylinder;

magnetic heads mounted on said rotary cylinder, said magnetic heads protruding outwardly from an outer peripheral surface of said rotary cylinder by a predetermined amount;

a stationary cylinder with a guide lead formed on a lower portion of an outer peripheral surface thereof for guiding a lower edge of a magnetic tape and defining a tape running face on an upper portion of said outer peripheral surface thereof;

a first protrusion portion formed on an upper edge portion of said tape running face of said stationary cylinder on a tape leaving side of said upper edge portion of said tape running face; and a second protrusion portion formed on said upper edge portion of said tape running face on said tape leaving side and in the vicinity of said first protrusion portion on a tape incoming side of said first protrusion portion, said second protrusion portion being smaller in radial height from a central axis of said stationary cylinder than said first protrusion portion, wherein said second protrusion portion and said first protrusion portion operate together to suppress vibration and maintain proper head-touch between the magnetic tape and said magnetic heads, wherein outer surfaces of the protrusion portions are of constant radial height and said outer surfaces are bounded and separated from areas of changing radial height by first and second edges, respectively.

2. The apparatus as in claim 1, wherein said first and second edges of said first and second protrusion portions on the side of said upper edge portion of said tape running face are parallel to said guide lead.

3. The apparatus as in claim 1, wherein said first and second edges of said first and second protrusion portions on the side of said upper edge portion of said tape running face are parallel to each other and non-parallel to said guide lead.

4. The apparatus as in claim 1, wherein said first and second edges of said first and second protrusion portions on the side of said upper edge portion of said tape running face are non-parallel to each other and one of said first and second edges of said first and second protrusion portions is parallel to said guide lead.

5. The apparatus as in claim 1, wherein said first edge of said first protrusion portion, said second edge of said second protrusion portion and said guide lead are non-parallel.

* * * * *